United States Patent
Olson et al.

(10) Patent No.: US 6,594,316 B2
(45) Date of Patent: Jul. 15, 2003

(54) METHOD AND APPARATUS FOR ADAPTIVE BIT RATE CONTROL IN AN ASYNCHRONIZED ENCODING SYSTEM

(75) Inventors: Michael L. Olson, Suwanee, GA (US); Si Jun Huang, Suwanee, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 426 days.

(21) Appl. No.: 09/735,236

(22) Filed: Dec. 12, 2000

(65) Prior Publication Data

US 2002/0159530 A1 Oct. 31, 2002

(51) Int. Cl.[7] .................................................. H04N 7/12
(52) U.S. Cl. .............................. 375/240.28; 370/395.62
(58) Field of Search ....................... 375/240.27, 340.28; 370/395.62; H04N 7/12

(56) References Cited

U.S. PATENT DOCUMENTS

| | | | |
|---|---|---|---|
| 5,506,844 A | 4/1996 | Rao | 370/468 |
| 5,543,853 A * | 8/1996 | Hashell et al. | 375/240.28 |
| 5,566,208 A | 10/1996 | Balakrishnan | 375/240 |
| 5,640,388 A | 6/1997 | Woodhead et al. | 370/468 |
| 5,652,627 A | 7/1997 | Allen | 348/497 |
| 5,677,969 A | 10/1997 | Auyeung et al. | 375/240.25 |
| 5,686,963 A | 11/1997 | Uz et al. | 375/240.06 |
| 5,708,664 A | 1/1998 | Budge et al. | 370/538 |
| 5,719,632 A | 2/1998 | Hoang et al. | 375/240.05 |
| 5,835,493 A | 11/1998 | Magee et al. | 370/395.62 |
| 5,838,686 A | 11/1998 | Ozkan | 370/433 |
| 5,861,919 A | 1/1999 | Perkins et al. | 348/385.1 |
| 5,862,140 A | 1/1999 | Shen et al. | 370/538 |
| 5,877,812 A | 3/1999 | Krause et al. | 375/240.25 |
| 6,219,067 B1 * | 4/2001 | Dieterich | 375/240.28 |

FOREIGN PATENT DOCUMENTS

| | | |
|---|---|---|
| EP | 0723345 | 7/1996 |
| GB | 2328099 | 2/1999 |
| WO | WO 00/41398 | 7/2000 |

OTHER PUBLICATIONS

Timing and Synchronization Using MPEG–2 Transport Streams, David K. Fibush, SMPTE Journal, Jul. 1996, pp. 395–400.

Resource Allocation for Variable Bit Rate Video, Stuart Dunstan and Khee Pang, IEEE, US. vol. 5, 1998, pp. 3116–3121, XP–000801607.

* cited by examiner

*Primary Examiner*—Howard Britton
(74) *Attorney, Agent, or Firm*—Kenneth M. Massaroni; Hubert J. Barnhardt, III; Shelley L. Couturier

(57) ABSTRACT

Techniques for determining an output rate for a bit stream, the output rate being determined by applying information read from the bit stream to available bandwidths. A digital flywheel provides continuous feedback from an encoding system to a video compression engine in order to assure that the clock rates between the two remain appropriately synchronized.

10 Claims, 11 Drawing Sheets

METHOD AND APPARATUS FOR ADAPTIVE BIT RATE CONTROL IN AN ASYNCHRONIZED ENCODING SYSTEM

FIELD OF THE INVENTION

The invention relates in general to the transmission of variable-rate bit streams and more particularly to detecting and preventing imminent bandwidth overflow. In particular, the invention relates to adaptive, high accuracy bit rate control of a coded bit stream in an asynchronized encoding system.

BACKGROUND OF THE INVENTION

In recent years, the transmission of data, and in particular video data, has exposed a problem related to the fact that video data often requires a high bandwidth, is bursty, and has temporal constraints. Traditionally, data transmission has been done on the public switched networks provided by the telephone companies or on packet networks. The public switched networks are designed for interactive voice applications and so provide relatively low-bandwidth circuits that satisfy stringent temporal constraints. The packet networks are designed for the transfer of data between computer systems. The only constraint is that the data eventually arrive at its destination. The bandwidth available for a transfer depends on the degree of congestion in the network. The packet networks thus typically make no guarantees about when or even in what order the data in a burst of data will arrive at its destination.

It may thus be appreciated that neither the telephone network nor the packet network is well adapted to handle high-bandwidth, bursty data with time constraints. An example of such data is digital television which has been compressed according to the Motion Picture Experts Group ("MPEG") MPEG-2 standard, as set forth in ISO/IEC 13818-1 and 13818-2.

The MPEG-2 standard defines an encoding scheme for compressing digital representations of video. The encoding scheme takes advantage of the fact that video images generally have large amounts of spatial and temporal redundancy. There is spatial redundancy because a given video picture has sections where the entire area has the same appearance; the larger the areas and the more of them there are, the greater amount of spatial redundancy in the image. There is temporal redundancy because there is often not much change between a given video image and the ones that precede and follow it in a sequence. The less change between two video images, the greater the amount of temporal redundancy. The more spatial redundancy there is in an image and the more temporal redundancy there is in the sequence of images to which the image belongs, the fewer the bits of information that will be needed to represent the next successive image.

The MPEG-2 compression scheme presents a sequence of video images as a sequence of compressed pictures, each of which must be decoded at a specific time. There are three ways in which pictures may be compressed. The first way is called intra-coding, in which the compression is done without reference to any other picture. This encoding technique reduces spatial redundancy but not time redundancy, and the pictures resulting from it are generally larger than those in which the encoding reduces both spatial redundancy and temporal redundancy. Pictures encoded in this way are called I-pictures. A certain number of I-pictures are required in a sequence, first, because the initial picture of a sequence is necessarily an I-picture, and second, because I-pictures permit recovery from transmission errors.

Time redundancy is reduced by encoding pictures as a set of changes from earlier or later pictures or both. In MPEG-2, this is done using motion compensated forward and backward predictions. When a picture uses only forward motion compensated prediction, it is called a Predictive-coded picture, or P picture. When a picture uses both forward and backward motion compensated predictions, it is called a bi-directional predictive-coded picture, or a B picture for short. P pictures generally have fewer bits than I-pictures and B pictures have the smallest number of bits. The number of bits required to encode a given sequence of pictures in MPEG-2 format is thus dependent on the distribution of picture coding types mentioned above, as well as the picture content itself. As will be apparent from the foregoing discussion, the sequence of pictures required to encode the images of the news anchorperson will have fewer and smaller I-pictures and smaller B and P pictures than the sequence required for the MTV song presentation, and consequently, the MPEG-2 representation of the images of the news anchorperson will be much smaller than the MPEG-2 representation of the images of the MTV sequence.

The MPEG-2 pictures are typically received by a receiver such as a consumer electronics device, namely a digital television set or a set-top box provided by a cable television ("CATV") service provider. The device constraints may limit the amount of memory available to store the MPEG-2 pictures. Moreover, the pictures are being used to produce moving images. The MPEG-2 pictures must consequently arrive in the receiver in the right order and with time intervals between them such that the next MPEG-2 picture is available when needed and there is room in the memory for the picture that is currently being sent. In the art, a memory that has run out of data is said to have underflowed, while a memory which has received more data than it can hold is said to have overflowed. In the case of underflow, the motion in the TV picture must stop until the next MPEG-2 picture arrives, and in the case of overflow, the data that did not fit into memory is simply lost.

It is also important to understand a distinction that MPEG-2 draws between a variable, bursty video data stream and a variable bit rate encoded stream. Indeed under MPEG-2, there is defined a constant bit rate ("CBR") and a variable bit rate ("VBR") stream. In an encoded CBR video sequence, a relatively motionless television anchorperson will still be encoded at a specified bit rate. I, P, and B pictures will all still be relatively large because the constraints of the CBR system will mandate fullness of the video "pipe". In VBR, the transmitted picture is only as large as it needs to be as there is no systemic requirement to fill the video pipe.

FIG. 1 is a representation of a system 10 including digital picture source 12 and a television 14 that are connected by a channel 16 that is carrying a MPEG-2 bit stream representation of a sequence of TV images. The digital picture source 12 generates uncompressed digital representations ("UDR") of images 18, which go to variable bit rate ("VBR") encoder 20. VBR Encoder 20 encodes the uncompressed digital representations to produce a variable rate bit stream ("VRBS") 22. Variable rate bit stream 22 is a sequence of compressed digital pictures 24(a . . . n) of variable length. When the encoding is done according to the MPEG-2 standard, the length of a picture depends on the complexity of the image it represents and whether it is an I-picture, a P picture, or a B picture. Additionally, the length of the picture depends on the encoding rate of VBR encoder 20. That rate can be varied. In general, the more bits used to encode a picture, the better the picture quality.

The VRBS 22 is transferred via channel 16 to VBR decoder 26, which decodes the compressed digital pictures 24(a . . . n) to produce uncompressed digital pictures 28. These in turn are provided to television 14. If television 14 is a digital television, they will be provided directly; otherwise, there will be another element that converts uncompressed digital pictures ("UDP") 28 into standard analog television signals and then provides those signals to television 14. There may of course be any number of VBR decoders 26 receiving the output of a single encoder 20.

In FIG. 1, channel 16 transfers VRBS 22 as a sequence of packets 30. The sequence of packets, in the context of the MPEG-2 standard, are known as the Packetized Elementary Stream or "PES". The compressed digital pictures 24 thus appear in FIG. 1 as varying-length sequences of packets 30. Thus, picture 24(a) may have "n" packets while picture 24(n) has "k" packets. Included in each picture 24 is timing information 32. Timing information contains two kinds of information: clock information and time stamps. Clock information is used to synchronize decoder 26 with encoder 20. The MPEG-2 specification refers to this clock information as the Program Clock Reference ("PCR"). The time stamps include the Decoding Time Stamp ("DTS") that specifies when a picture is to be decoded and the Presentation Time Stamp ("PTS") that specifies when it is actually to be displayed. The times specified in the time stamps are specified in terms of the clock information. VBR decoder 26 contains a relatively small amount of memory for storing pictures 24 until they are decoded and provided to TV 14. This memory is shown at 34 in FIG. 1 and will be referred to hereinafter as the decoder's bit buffer. Bit buffer 34 must be at least large enough to hold the largest possible MPEG-2 picture. Further, channel 16 must provide the pictures 24 to bit buffer 34 in such fashion that decoder 26 can make them available at the proper times to TV 14 and that bit buffer 34 never overflows or underflows. Bit buffer 34 underflows if not all of the bits in a picture 24 have arrived in bit buffer by the time specified in the picture's time stamp for decoder to begin decoding the picture.

Referring now to FIG. 2, there is illustrated therein a conceptual block diagram of a typical MPEG-2 encoder implementation. The problem inherent in this implementation, and which will be described in greater detail below, relates to the fact that the variable PES bit rate out of the video encoding engine does not match the system rate. The problems created by this mismatch will become apparent. As illustrated in FIG. 2, raw video from a raw video input 40 is coupled to video encoding engine 42 where it is compressed by, e.g., the MPEG-2 coding algorithm. In a constant bit rate (CBR) coding system, the MPEG-2 encoding engine assumes the coded bits in its coded bit buffer 44 are being passed to the encoding system, FPGA transport packetizer 46, at a constant bit rate $R_u$. This bit rate is dependent on the video encoding engine's internal bit rate calculation, regardless of the coded bit buffer level or the rate at which the system is removing coded data from the coded bit stream buffer. This removal rate is known as $R_j$.

As is illustrated in FIG. 2, the coded bit stream is passed to the transport stream packetizer 46 from the coded bit stream buffer 44 at the bit rate $R_j$i. Due to the addition of a transport packet header at transport stream packetizer 46, the transport stream packetizer output rate $R_t$ is different than $R_j$ such that $R_t > R_j$. In a CBR real-time digital encoding system, it is vital that the decoder input bit buffer (34 of FIG. 1) is fed continuously with coded bits at the bit rate at which they were originally generated. When $R_u$ is equal to $R_j$, the decoder's buffer limits are not violated; that is neither overflow nor underflow results. Conversely, if the bits enter the decoder's input bit buffer at a bit rate other than $R_u$ a decoder buffer overflow or underflow will occur causing a video disruption in the decoder's output. One possible solution is to require the use of one system clock to control both encoding engine and coded bit stream processing circuits. However, in a real-world implementation shown in FIG. 2, this ideal condition may not be met.

Accordingly, there exists a need for an improved method and apparatus for assuring that the bit rates Ru and Rj are sufficiently matched so as to assure that neither a decoder overflow nor underflow occurs. This would be particularly advantageous as applied to a CBR system. Such a solution must take advantage of the already existing clock rates built into the system rather than imposing an additional clock rate as described above.

DETAILED DESCRIPTION OF THE PREFERRED EMBODIMENTS

Figure 1:
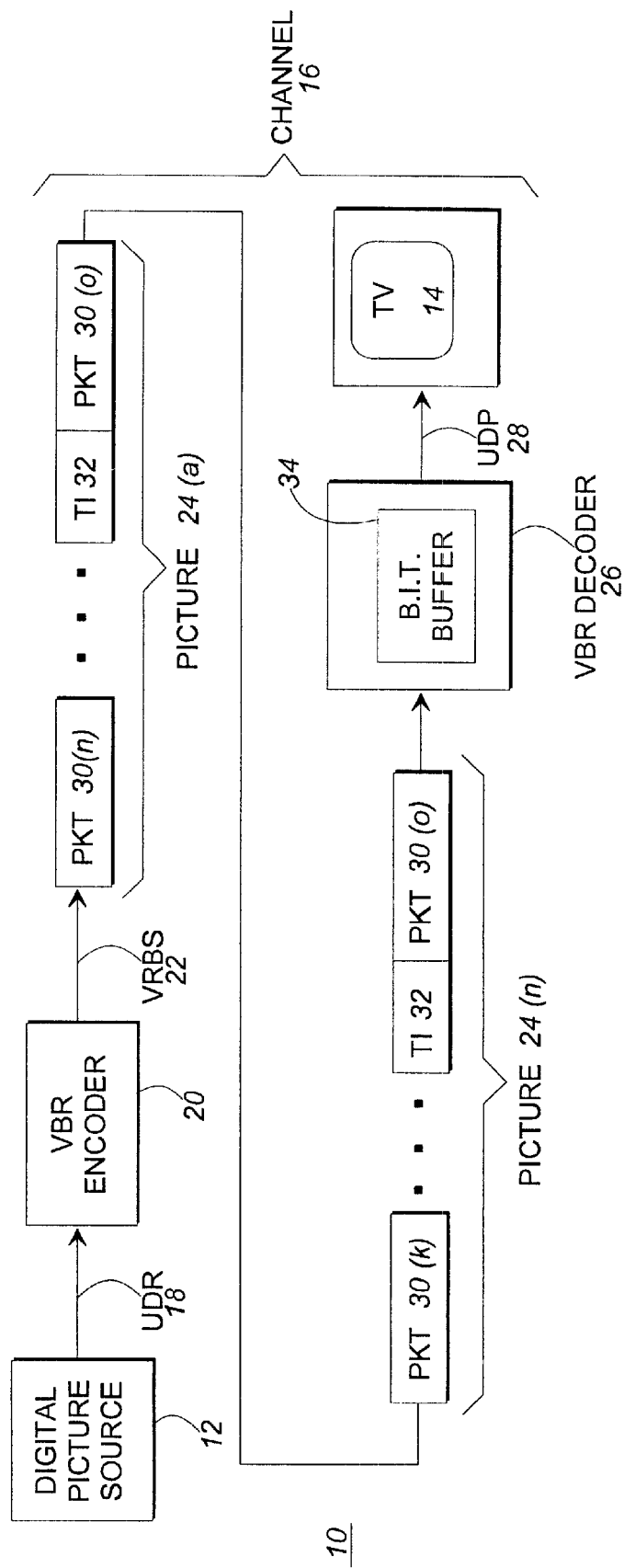
FIG. 1 is a block diagram illustrating how digital television pictures are encoded, transmitted, and decoded.
Figure 2:
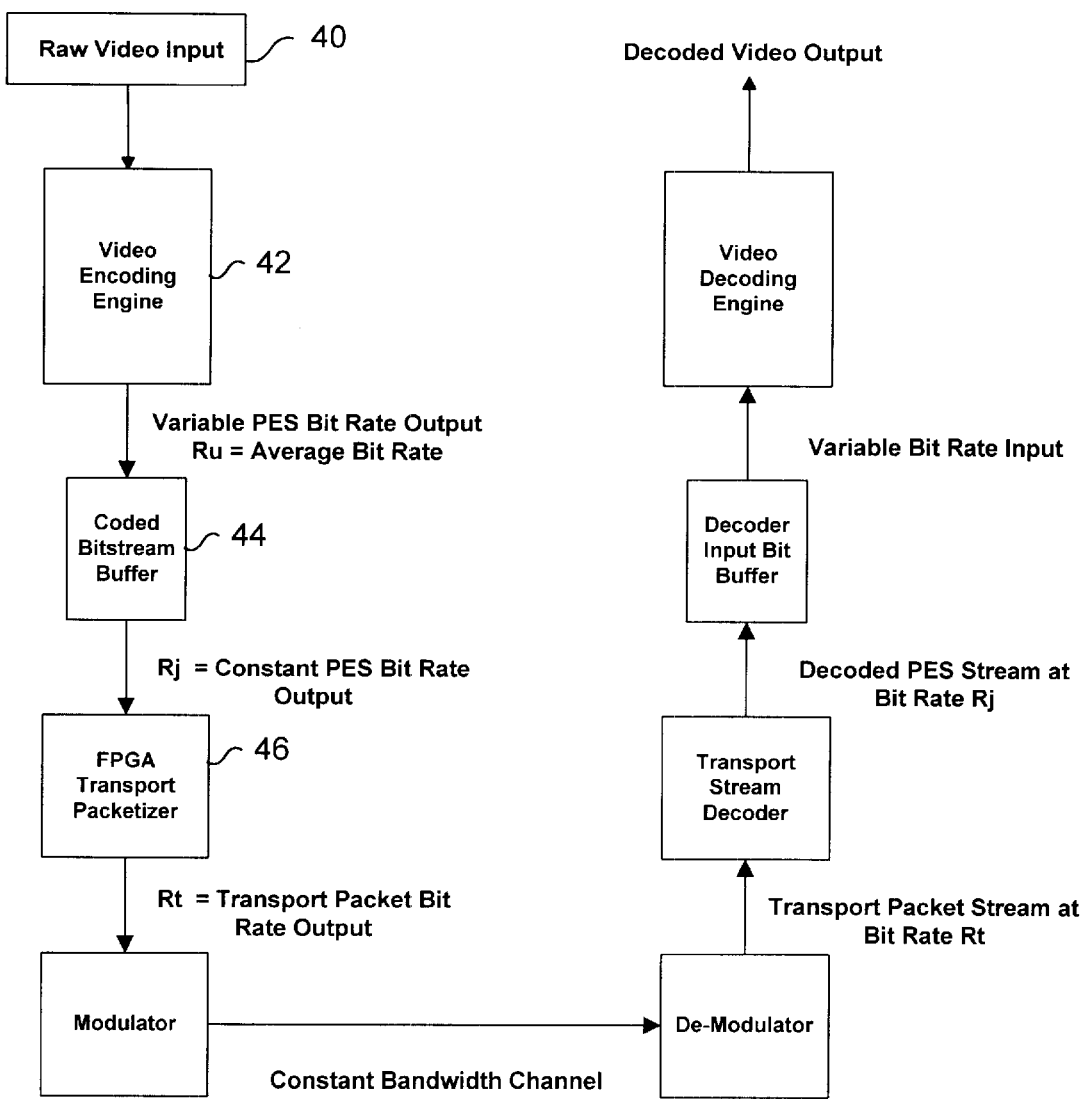
FIG. 2 is a conceptual block diagram of a typical MPEG-2 encoder implementation.

While the specification concludes with claims defining the features of the invention that are regarded as novel, it is believed that the invention will be better understood from a consideration of the following description in conjunction with the drawing figures, in which like reference numerals are carried forward.

Figure 3:
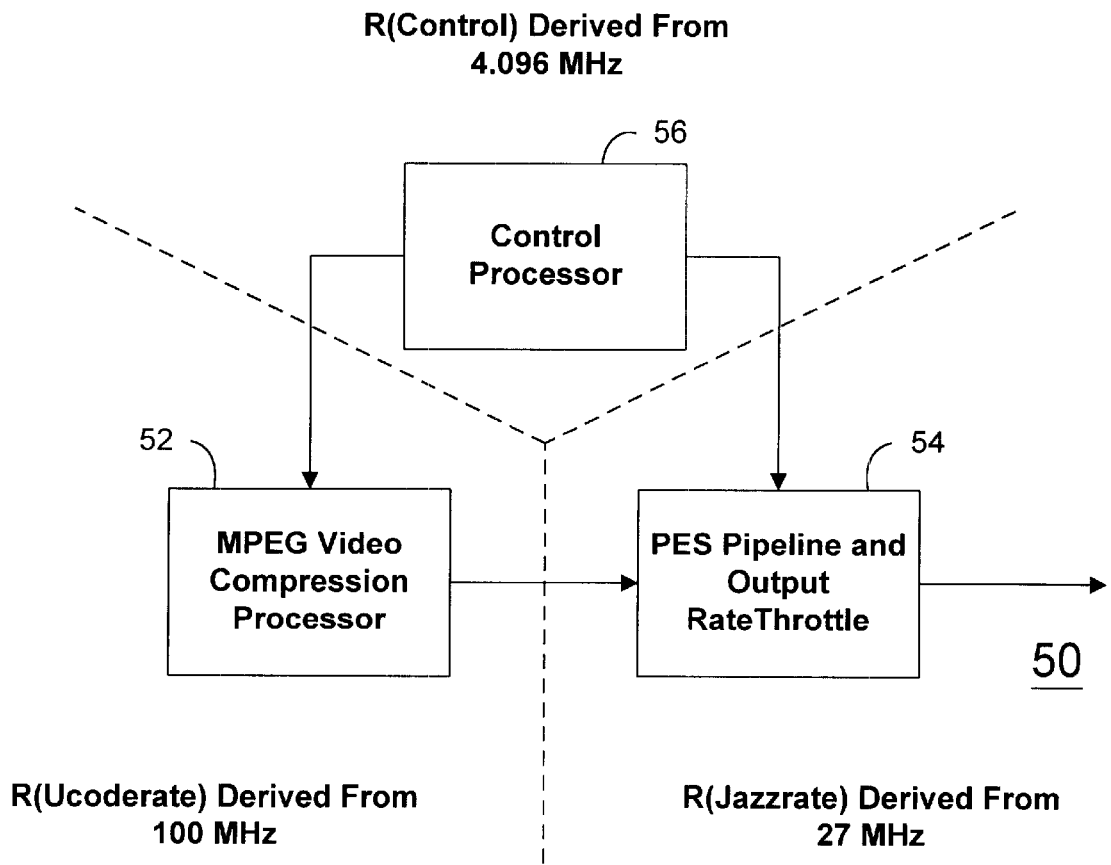
FIG. 3 is a frequency block diagram illustrating clock frequency of an encoding system, in accordance with the instant invention.

Referring now to FIG. 3 there is illustrated therein a frequency block diagram, according to clock frequency, illustrating three major functional blocks and time bases in a digital video encoder. These three blocks are clocked at different frequencies, and without a phase lock between any one of the clocks. The digital video encoder 50 includes a first block which is a video compression engine 52 that encodes the video stream into a PES stream at a specified bit rate $R_u$. In this embodiment the video compression engine 52 is an MPEG-2 video compression engine processor, and is clocked by a 100 megahertz ("MHz") clock input. The second block is represented by the PES pipeline or video encoding system 54, and is operating at a second frequency of 27 MHz. The third block 56 illustrates the invented control processor which operates at a third frequency, typically 4.096 MHz, and which sets up the encoding rate of the MPEG II video compression processor $R_u$ and the critical output throttle rate $R_j$ of the PES pipeline. Accordingly, it maybe appreciated that the encoding system illustrated in FIG. 3 is an asynchronous encoding system from the standpoint that the clocks used in blocks 52, 54 and 56 may each have different, independent frequencies. Further, the operation of any one block does not depend on different timing frequency of any of the other blocks. This, however is the source of the problem solved by the instant invention. More particularly, the MPEG-2 video compression processor compresses and outputs video PES data at a rate $R_j$ that is solely based on its own calculation which is derived from the 100 MHz processor clock. Conversely, the PES pipeline is passing compressed PES video data to the rest of the encoding system solely based on its own bit rate calculation that is derived from the separate 27 MHz clock. Accordingly, in an ideal situation $R_j$ will equal $R_u$; that is a match of $R_j$ and $R_u$ would lock the bit rate from the video compression engine to the output PES pipeline. As noted above, one way to solve this problem would be to use a single system clock to control both the encoding engine and the coded bit stream processing circuits. However, in real world implementations this is neither practical, nor commercially feasible.

Accordingly, in order to match the bit rates $R_u$ and $R_j$, an asynchronous adaptive rate control method is described. This asynchronous adaptive rate control method uses timing information already embedded in the MPEG-2 data stream to calculate the proper time and adaptively adjust the PES pipeline output rate $R_j$, to accurately match the video compression engine rate $R_u$ so that the MPEG video bit stream is delivered to a decoder at the intended time.

Figure 4:
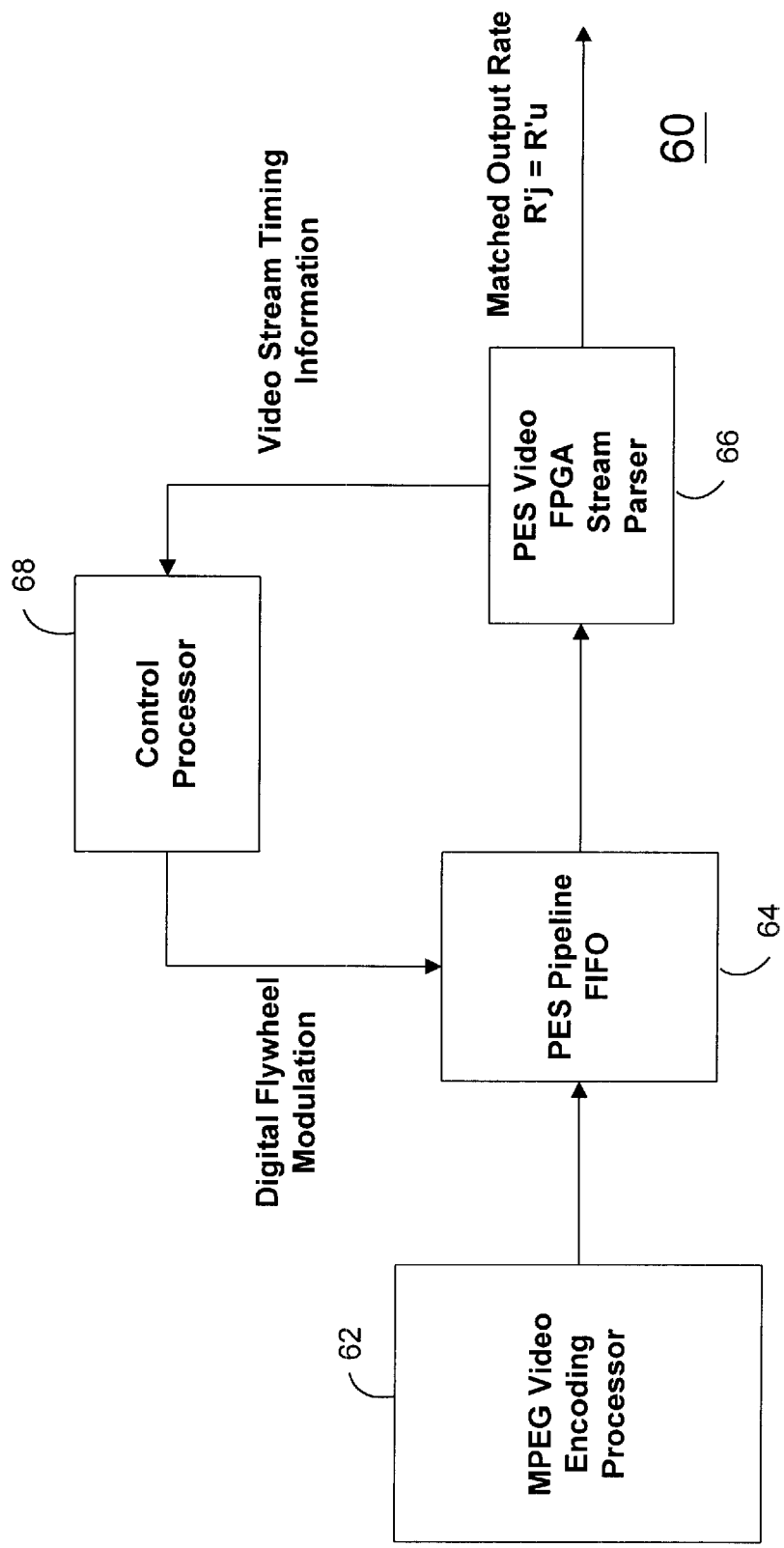
FIG. 4 is a conceptual block diagram of an adaptive rate control feedback, in accordance with the instant invention.

Referring now to FIG. 4, there is illustrated therein a conceptual block diagram of an adaptive rate control method in accordance with the instant invention. The block diagram 60 illustrates an adaptive rate control method in which the PES video data stream output of the MPEG video compression engine 62 is examined and compared to two video MPEG data stream elements, and uses the derived difference to adaptively modulated digital "flywheel" in a PES video field programmable gate array ("FPGA") stream parser 66. To accurately match the output rate of the MPEG video encoder 62 to the PES pipeline FIFO 64 such that a matched output rate of $R'_j$ equals $R'_u$. This digital "flywheel" is implemented in a control processor 68 in which video stream timing information is output from the PES video FPGA stream parser 66, subjected to an adaptive rate control algorithm (as described in greater detail herein below) and control processor 68, and input into the PES pipeline FIFO 64.

Figure 5:
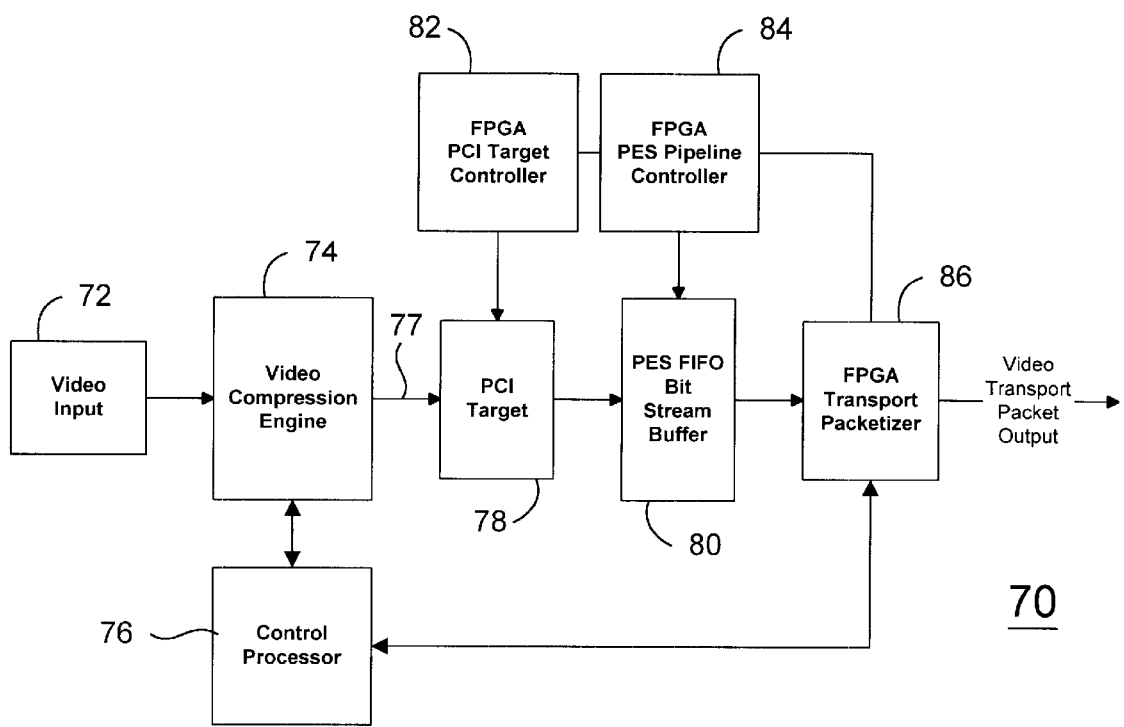
FIG. 5 is a block diagram of one embodiment of an adaptive rate control feedback loop, in accordance with the instant invention.

Referring now to FIG. 5, there is illustrated therein a block diagram of one embodiment of an apparatus adapted to accomplish adaptive rate control, in accordance with the instant invention. The digital video encoder 70 supplies raw video input at video input 72 and supplies it to the video compression engine 74. The video compression engine receives the raw video input and encodes it according to a particular video compression algorithm or protocol, and example of which is the MPEG-2 video compression encoding algorithm. A control processor 76 configures, monitors, and adjusts the encoding parameters pursuant to an adaptive rate control algorithm which will be described in greater detail herein below. The compressed encoded bit stream leaves the video compression engine 74 and enters the output pipeline where it is buffered in the PES FIFO bit stream buffer 80 and converted from a packetized elementary stream into a transport stream.

More particularly, the physical interface for the video compression engine 74 is a Peripheral Component Interconnect ("PCI") bus 77. This is the same bus standard that is used in personal computers, and the PCI bus 77 couples the video compression engine 74 to a PCI target 78. The PCI target 78 is the physical "target" of the compressed video data stream. Coupled to the PCI target is a field programmable gate array ("FGPA") PCI target controller 82. The FPGA PCI target controller 82 is a custom programmed FPGA, with state machines and control signals, that reads compressed video data from the PCI target and writes it to the PES FIFO bit stream buffer 80. The PES FIFO bit stream buffer 82 is a large FIFO array that stores the compressed video data. The PES FIFO bit stream buffer 82 provides an important function since the PCI bus 77, located between the video compression engine 74 and PCI target 78, is non-deterministic. In other words, compressed video data is extremely bursty across the PCI bus 77. At times there are very large "I" pictures that are burst transferred across the PCI bus. At other times there are no transfers across the bus. The PES FIFO bit stream buffer absorbs some of this burstiness.

Coupled to the FPGA PCI target controller is a FPGA PES pipeline controller 84. The FPGA PES pipeline controller 84 is another custom programmed FPGA, with state machines and control signals, and which reads data out of the PES FIFO bit stream buffer 80 and passes it to a FPGA transport packetizer 86. The FPGA PES pipeline controller 84 controls the rate that data is removed from the PES FIFO bit stream buffer 80. The FPGA transport packetizer 86 converts the PES stream into a transport packet stream. The FPGA transport packetizer 86 also parses the compressed video data for the video buffer verifier delay ("VBV_delay), and decode time stamp ("DTS") values. The control processor 76 is used to configure the FPGA transport packetizer 86 with a unique Program Identifier (PID) and sets the PCR insertion interval in the video transport packet. The control processor 76 may also connect and configure other parameters in each of the FPGAs described above.

In order to provide the adaptive rate control as illustrated hereinabove with respect to FIGS. 4 and 5, it is necessary to parse the bit stream output from the video compression engine to identify at least first and second time parameters in the bit stream. Preferably the time parameters are embedded in the bit stream and are two timing elements in the coded MPEG-2 video data stream. These two data values embedded in the video data stream by the MPEG-2 video compression may be, for example, the DTS and the VBV delay. These values are used by for example, an MPEG video decoder to decode and display each video frame at the appropriate time. A third parameter, the system time clock ("STC") is the local time of the encoding system. While these time parameters will be used to describe the invention in greater detail hereinbelow, it is to be understood that other time parameters embedded in the video stream may also be used. For example, and as noted above, the program clock reference and the presentation time stamp are both alternatives which may be employed in connection with the instant invention. Others will be understood to those familiar with video compression algorithms and protocols.

The PES packet definition and DTS location can be identified as follows:

| Syntax | No. of Bits | Mnemonic |
|---|---|---|
| PES_packet( ) { | | |
| packet_start_code_prefix | 24 | bslbf |
| stream id | 8 | uimsbf |
| PES_packet_length | 16 | uimsbf |
| ... | | |
| PTS_DTS_flags | 2 | Bslbf |
| ... | | |
| If (PTS_DTS_flags == '10') { | | |
| '0010' | 4 | bslbf |
| PTS[32..30] | 3 | bslbf |
| Marker_bit | 1 | bslbf |
| PTS[29..15] | 15 | bslbf |
| Marker_bit | 1 | bslbf |
| PTS[14..0] | 15 | bslbf |
| Marker_bit | 1 | bslbf |
| } | | |
| If (PTS_DTS_flags == '11') { | | |
| '0011' | 4 | bslbf |
| PTS[32..30] | 3 | bslbf |
| Marker_bit | 1 | bslbf |
| PTS[29..15] | 15 | bslbf |
| Marker_bit | 1 | bslbf |
| PTS[14..0] | 15 | bslbf |
| Marker_bit | 1 | bslbf |
| '0001' | 4 | bslbf |
| DTS[32..30] | 3 | bslbf |
| Marker_bit | 1 | bslbf |
| DTS(29..15] | 15 | bslbf |
| Marker_bit | 1 | bslbf |
| DTS[14..0] | 15 | bslbf |
| Marker_bit | 1 | bslbf |
| } | | |
| ... | | |

Likewise, the picture header definition and the VBV_delay location is identified as follows:

| Syntax | No. of Bits | Mnemonic |
|---|---|---|
| Picture_header(){ | | |
| Picture_start_code | 32 | bslbf |
| ... | | |
| VBV_delay | 16 | uimsbf |
| ... | | |

The adaptive rate control method and algorithm is determined by the difference between the VBV_delay and the DTS-STC determines the deviation between the MPEG-2 video encoding rate $R_u$ and the video encoding system rate $R_j$, according to the formula:

$$T_{error}(sec)=(VBV\_delay-(DTS-STC))4/90,000$$

Wherein the $T_{error}$ rate is converted into a bit error deviation or error difference for each frame. This bit error rate is called $B_{error}$. This is the difference in bits per frame between the video encoding rate $R_u$ and the encoding system rate $R_j$. Accordingly:

$$B_{error}(bits)=(T_{error}*R_u)/frame\_rate$$

The frame_rate is based on the number of frames per second (e.g. 29.97 times per second for NTSC signals and 25 times per second for PAL signals). The $B_{error}$ difference or deviation is used to modulate the digital flywheel described in FIGS. 4 and 5, and the video encoder pipeline FPGA that controls the rate the data is passed between the video compression engine and the video encoding system. $R'_j$ is the new modulated output rate that accurately matches the video encoder bit rate output R. Accordingly:

$$R'_j=R_j+B_{error}$$

The constant parsing, feedback and output rate modulation that matches to a high degree of accuracy the output of the video encoding processor to the video encoding system. FIGS. 7–10 will illustrate the accuracy of the adaptive rate control algorithm.

Figure 6:
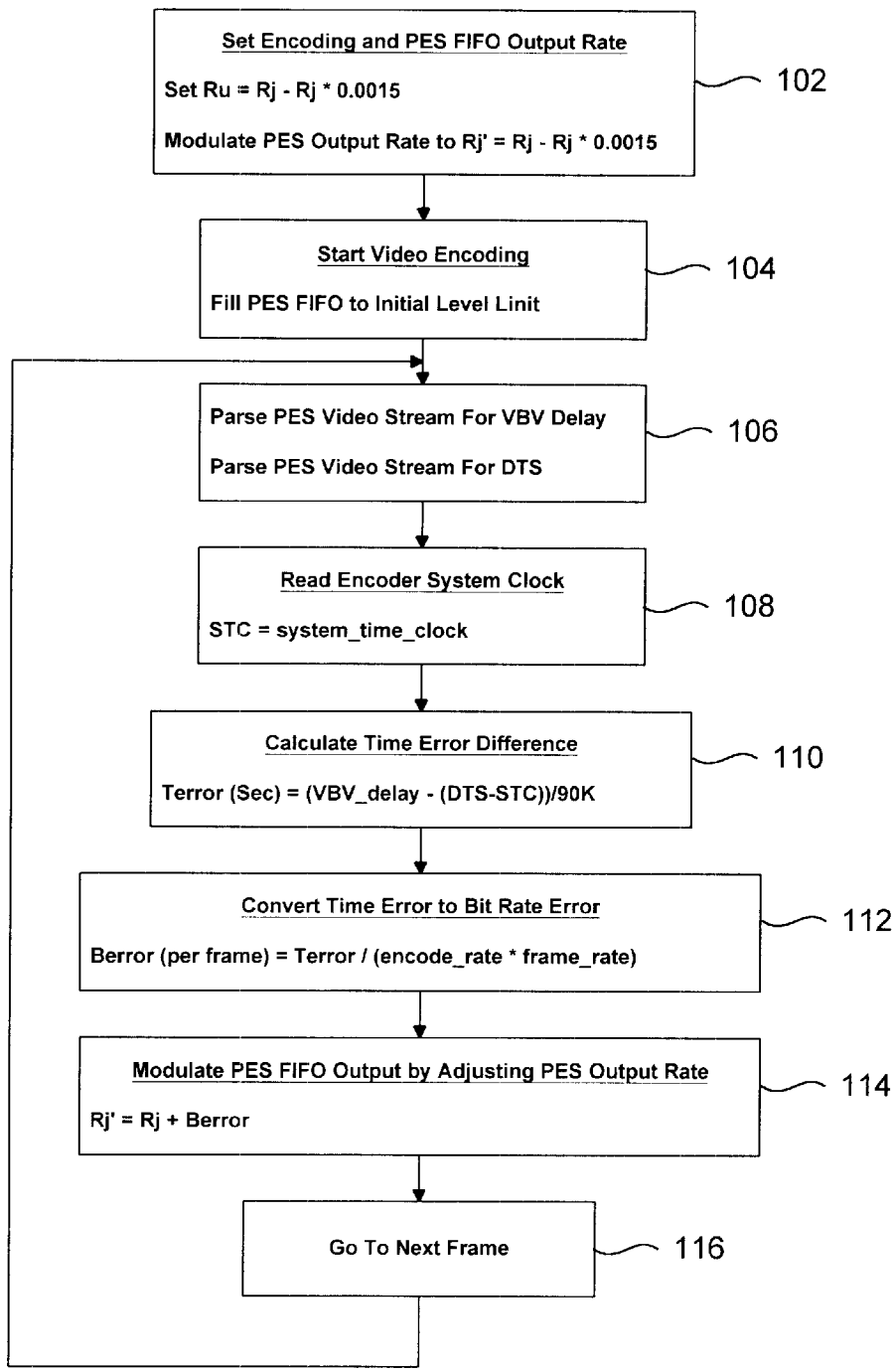
FIG. 6 is a flowchart illustrating an adaptive rate control algorithm, in accordance with the instant invention.

Referring now to FIG. 6 there is illustrated therein a flowchart of the adaptive rate control algorithm 100 in accordance with the instant invention. The flowchart starts in box 102 in which the encoding and PES FIFO output rates are set to an initial output rate wherein $R_u=R_j-R_j*0.0015$. The value of 0.0015 is the predetermined percentage (0.15%) of data to be skipped every second, and represents a fixed, predetermined number of byte transfers from the PES FIFO bit stream buffer 80 to the FPGA transport packetizer 86. Likewise, $R_u$ and $R_j$ are both set to reflect this decrease in bitrate. Thus, the digital counter is fixed at a constant frequency.

Continuing now in box 104, there is illustrated therein the step of initiating the video encoding process and filling the PES FIFO to an initial level limit. This step is defined by filling the FIFO to an initial limit set by the system, and based on known parameters. The PES FIFO is set to an initial fullness level because of the bursty nature of the compressed video data being written to the PES bit stream buffer. The initial FIFO level allows data to continuously read from the FIFO while there are periods where no compressed video data is being written to the FIFO creating the potential for the FIFO to become empty and underflow (causing video disruptions).

Referring now to box 106, there is illustrated therein the step of parsing the packetized elementary video stream to identify and examine the VBV_delay time parameter and the DTS time parameter. This information is parsed for each discreet frame, and is repeated each and every frame.

Box 108 illustrates the step of reading the encoder system time clock or STC. Thereafter, as illustrated in box 110, the algorithm calculates the time error difference, $T_{error}$, as illustrated hereinabove with respect to the recited formula. Thereafter, in box 112, there is illustrated the step of converting the time error ($T_{error}$) to the bit rate error ($B_{error}$) pursuant to the formula recited hereinabove.

Box 114 then illustrates the step of modulating the PES FIFO output by adjusting the PES output rate so that $R'_j=R_j+_{error}$, as described hereinabove. Step 116 then indicates that the process goes onto the next frame of video information to be encoded, and returns the process to the stage between step 104 and 106 wherein the next video frame is subjected to the parsing step described in step 106.

Figure 7:
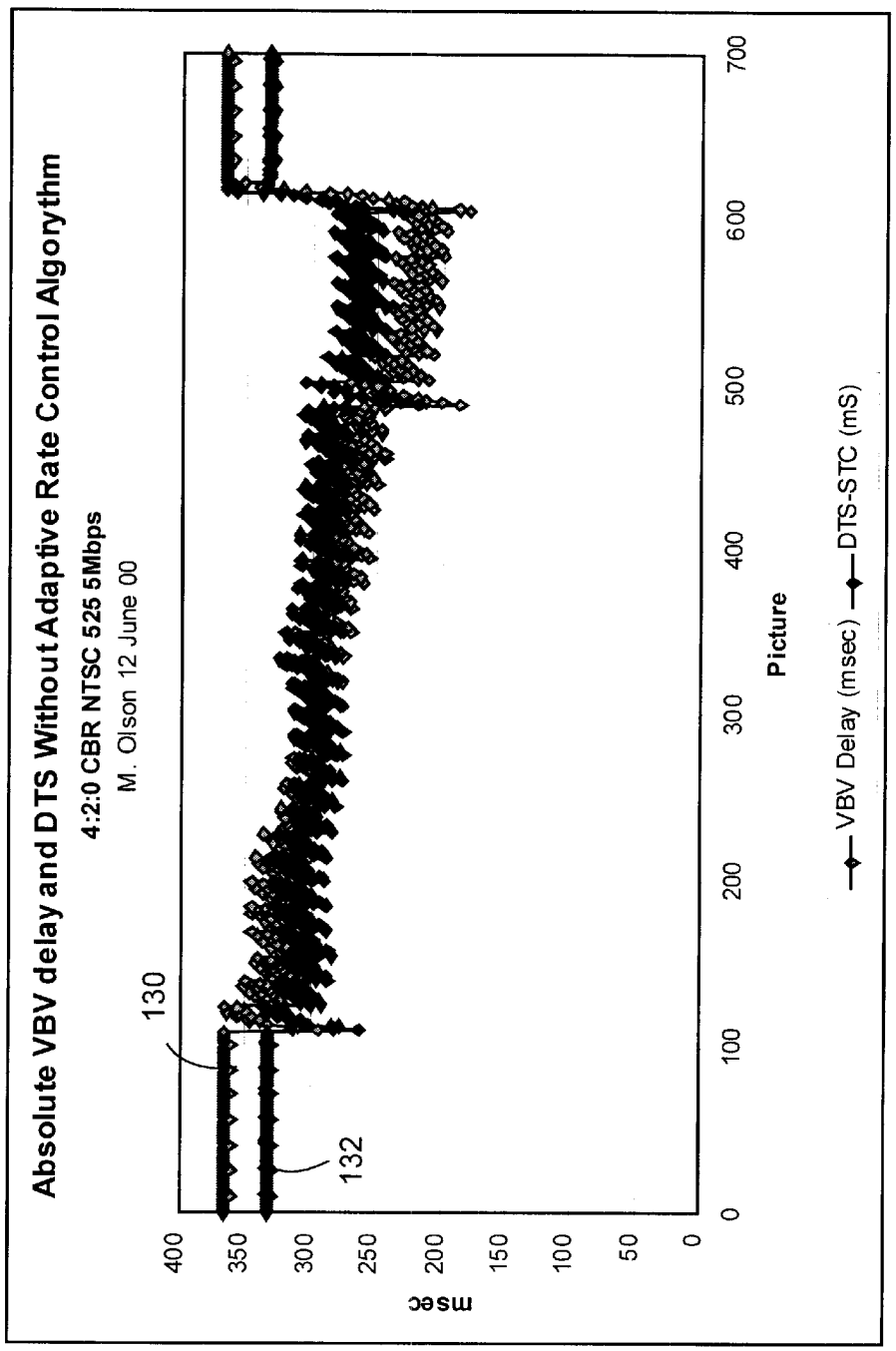
FIG. 7 is a chart illustrating the divergence between video buffer verifier delay and decoding time stamp—system time clock in an MPEG encoding system without an adaptive rate control method.

To understand the problems inherent in his system without an adaptive rate control method such as that of the instant invention. Specifically, FIG. 7 shows the divergence between VBV_delay and the DTS-STC in an MPEG encoding system without an adaptive control method. Time measured in milliseconds is illustrated on the Y axis, while picture in terms of frames is illustrated on the X axis. Trace 130 illustrates the VBV_delay in milliseconds, while trace 132 illustrates the DTS-STC in milliseconds. The difference between the VBV_delay and the DTS-STC curves is the error in the bit rate difference between $R_u$ and $R_j$.

Figure 8:
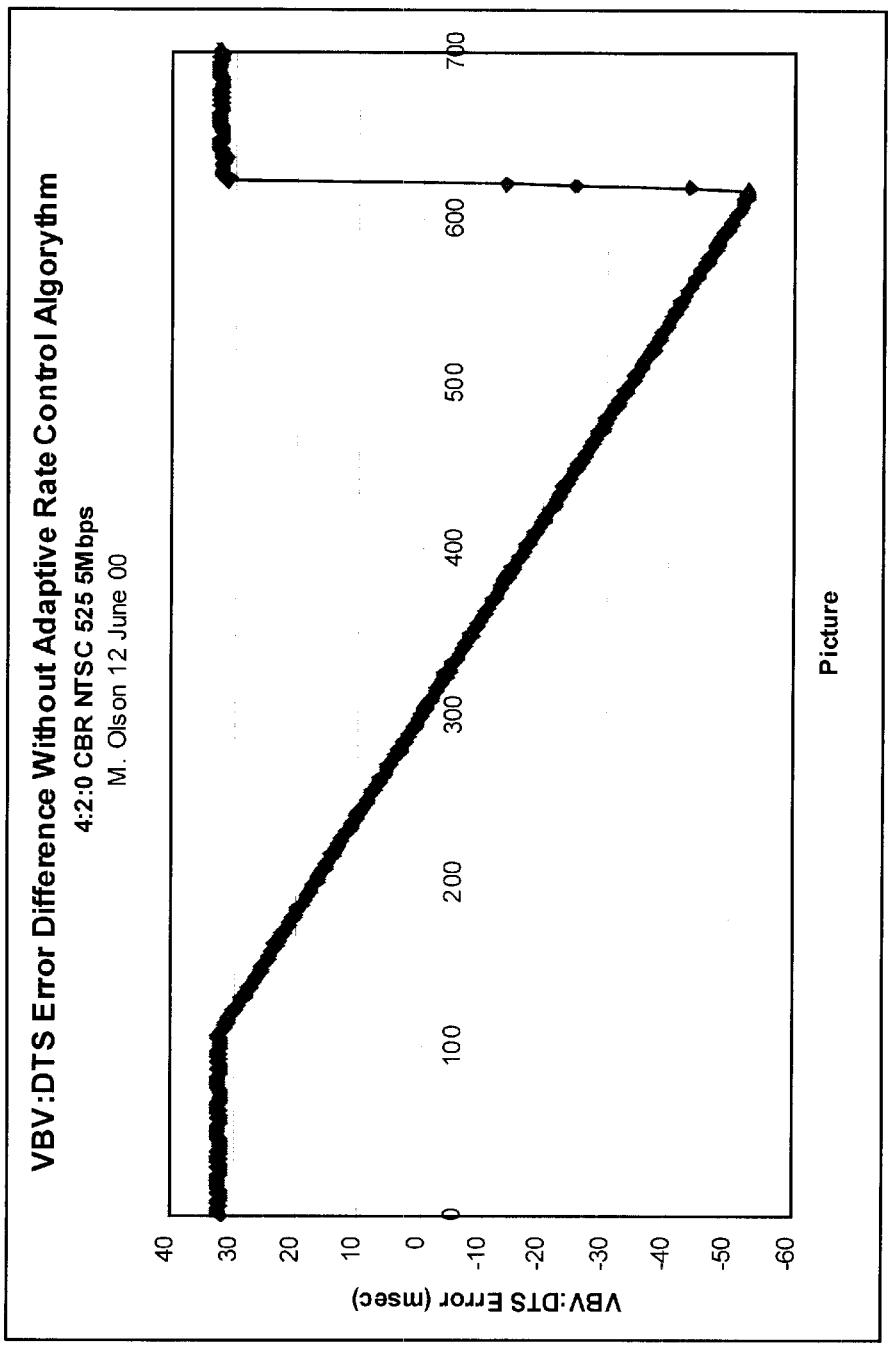
FIG. 8 is a chart illustrating the time clock error difference between the video buffer verifier and the decode time stamp-system time clock as shown in FIG. 7.

To put this in context, FIG. 8 shows the VBV:DTS error difference from FIG. 7. Ideally, the error difference would be at or very close to zero. However, in the instance of FIG. 7, the deviation error ranges from 32.0 milliseconds to −53.0 milliseconds. In the context of an MPEG-2 encoder, this amount of VBV:DTS-STC error is significant. Indeed, any deviation of the VBV_delay from the DTS represents an error in the delivery of the compressed video data stream to the decoder. It can be difficult to explicitly describe, for any given video sequence, the amount of error that can be tolerated by the decoder before the decoder's internal buffers overflow or underflow. This is further complicated by the fact that error difference varies greatly according to video source material complexity and is therefore difficult to predict.

Figure 9:
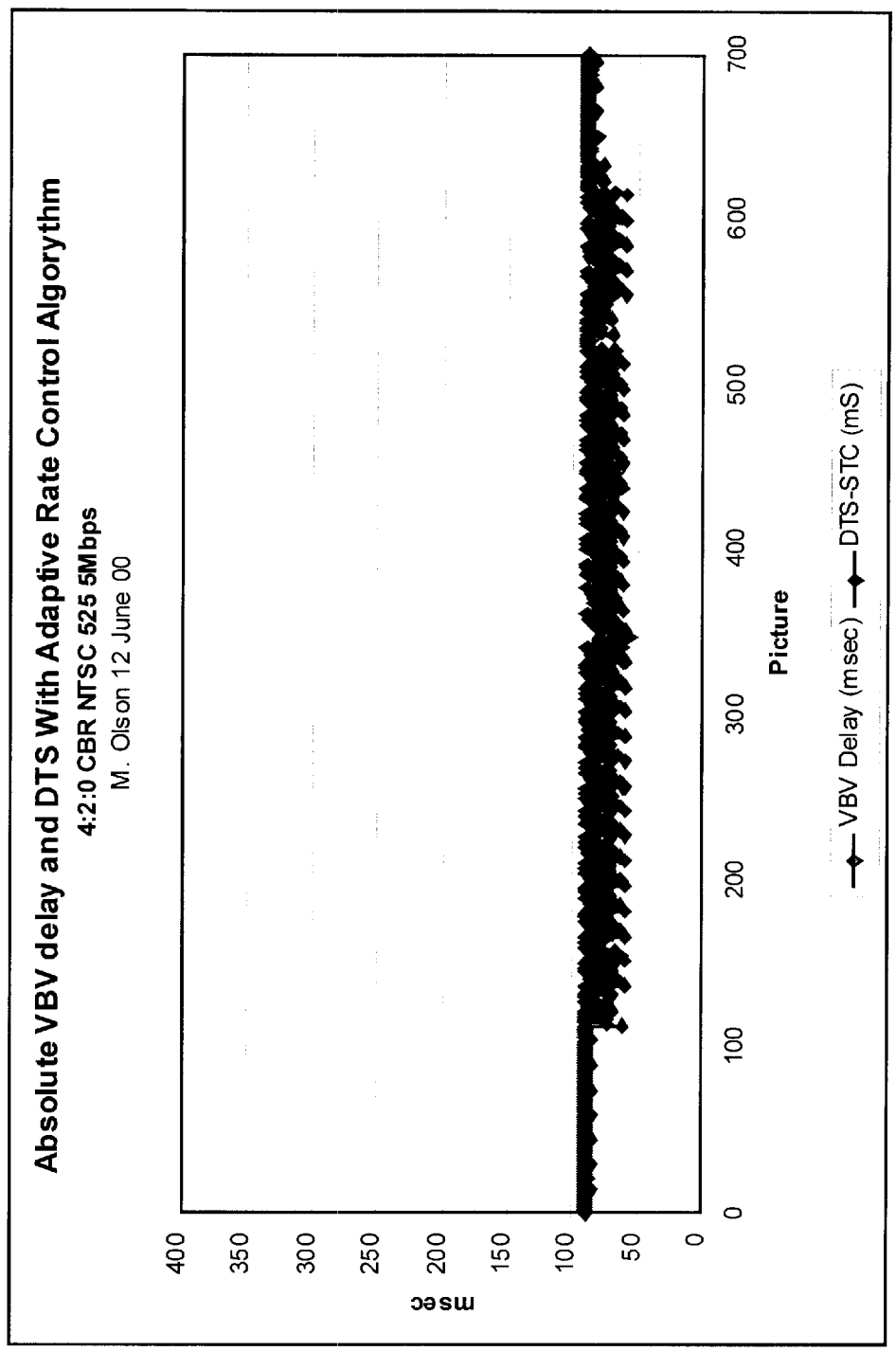
FIG. 9 illustrates the absolute video buffer verifier delay and the decoding time stamp—system time clock values, as shown in FIG. 7, however with an adaptive rate control method enabled, in accordance with the instant invention.
Figure 10:
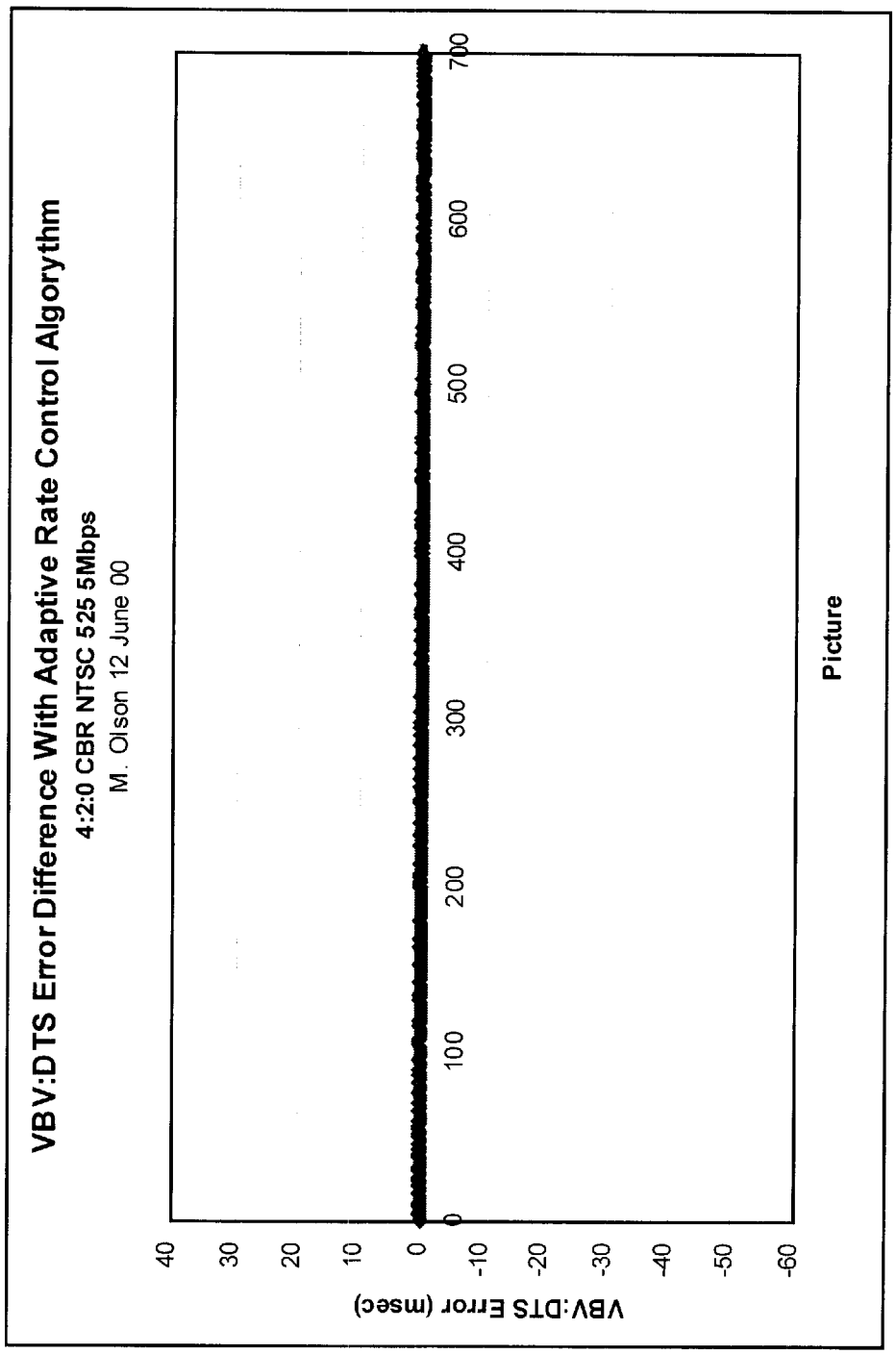
FIG. 10 illustrates the absolute error difference of the video buffer verifier delay: decode time stamp-system time clock error difference from FIG. 8.

Referring now to FIG. 9, there is illustrated therein a video stream rate control using the adaptive rate control method of the instant invention. FIG. 9 shows the absolute VBV_delay and the DTS-STC values with the adaptive rate control method enabled. Line 142 illustrates the VBV_delay while 144 illustrates the DTS-STC delay along the same scale as is illustrated in FIG. 7. As may be appreciated from the perusal of FIG. 9, the VBV_delay and the DTS-STC are coincident and are very close to the ideal. For further perspective, FIG. 10 illustrates that the absolute error difference, from FIG. 9, of the VBV_delay and the DTS-STC with adaptive rate control is near the ideal of zero. The importance of these graphs is that they illustrate the error difference which represents a timing error in the delivery of the encoded video data from the encoder to the decoder. Under different buffer levels in the decoder these timing errors in the delivery of the compressed video data will cause buffer underflows and buffer overflows. With adaptive rate control the encoder is delivering compressed video data at the time that it is required. This benefits encoder system interoperability, and robustness.

Figure 11:
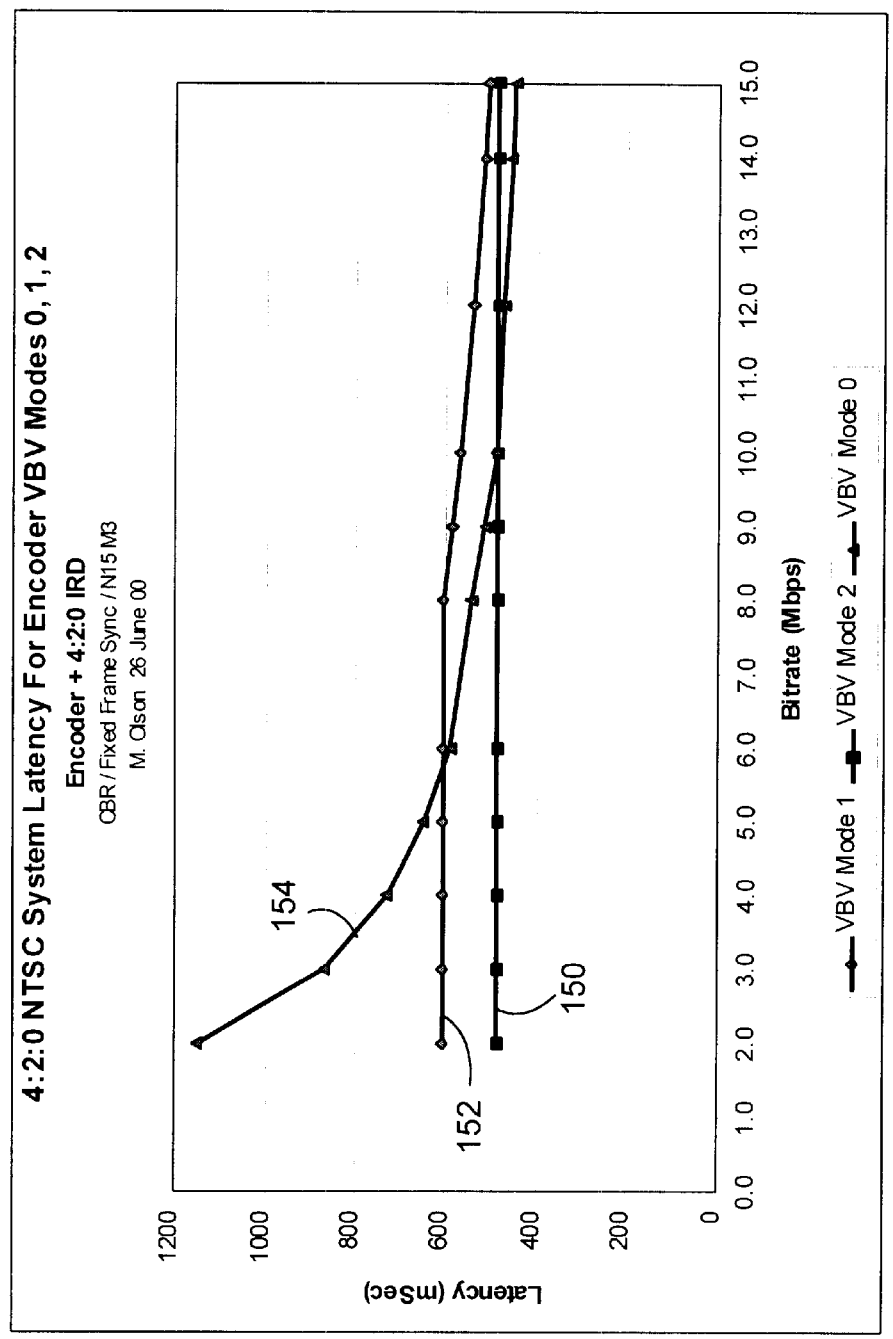
FIG. 11 illustrates the encoding system latency with an adaptive rate control method enabled versus with no adaptive rate control method enabled.

Finally, to illustrate the benefits of the instant system, FIG. 11 illustrates an encoding latency system with adaptive rate control illustrated by lines 150 and 152 versus and encoding system with non-adaptive rate control illustrated by line 154. Latency is illustrated along the Y axis and is measured in milliseconds, while bit rate measured in megabits per second is plotted along the X axis. Accordingly, it can be appreciated that the important advantage of the adaptive rate control system of the instant invention as is illustrated by lines 150 and 152 is a reduction by one-half to two-thirds of latency times, particularly at lower bit rates. This is important because low system latency is a highly desirable feature from a customer application perspective. For example, in a digital satellite news gathering setup an increase in system latency causes unwanted delays between the studio and the remote location (the remote location encodes and transmits, while the local studio receives and decodes). This interferes with "live" question and answer communication between different locations.

The foregoing Detailed Description has disclosed to those skilled in the arts to which the invention pertains how to make and use apparatus for outputting a bit stream to avoid overflow or underflow in the receiver. For these reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for controlling the output bit rate of a coded bit stream in an asynchronized encoding system, the asynchronized encoding system comprising a video compression engine having a first clock and outputting a bit stream at a first rate, and a video encoder having a second clock and outputting a bit stream at a second rate, said method comprising the steps of:

parsing the bit stream output from the video compression engine to identify at least a first and second time parameter in said bit stream;

determining a bit error deviation for each frame of video output by said video encoding system, said bit error deviation calculated from said first and second time parameters; and modulating the output of the video compression engine based upon the bit error deviation.

2. A method as in claim 1, wherein said bit streams are MPEG-2 bit streams.

3. A method as in claim 2, wherein said first time parameter is an MPEG-2 time stamp.

4. A method as in claim 3, wherein said MPEG-2 time stamp is a decode time stamp (DTS).

5. A method as in claim 3, wherein said MPEG-2 time stamp is a presentation time stamp (PTS).

6. A method as in claim 1, wherein said second time parameter is a video buffer verifier delay (VBV_delay) value.

7. A method as in claim 1, wherein said second clock is a system time clock (STC) representing the local time of the encoding system.

8. A method as in claim 1, wherein the bit error deviation is based on a time error deviation.

9. A method as in claim 8, wherein the time error deviation ($T_{error}$) is calculated as follows:

$$T_{error}(Sec) = (VBV\_delay - (DTS - STC))/90{,}000.$$

10. A method as in claim 9, wherein a bit error deviation (Berror) is calculated for each frame, as follows:

$$B_{error}(bits) = (T_{error} * R_u)/\text{frame rate}$$

where Ru represents the rate at which the video compression engine outputs a bit stream.

* * * * *

UNITED STATES PATENT AND TRADEMARK OFFICE
CERTIFICATE OF CORRECTION

PATENT NO.    : 6,594,316 B2
DATED         : July 15, 2003
INVENTOR(S)   : Olson et al.

It is certified that error appears in the above-identified patent and that said Letters Patent is hereby corrected as shown below:

Column 3,
Line 62, delete "$R_j i.$" and insert therefore -- $R_j.$ --.

Column 7,
Line 14, under "Syntax, PES_packet(){", delete "stream id" and insert therefore
-- stream_id --.

Column 8,
Line 9, delete "R." and insert therefore -- $R_u.$ --.
Line 55, delete "$R'_j = R_j + _{error,}$" and insert therefore -- $R'_j = R_j + B_{error}$, --.

Signed and Sealed this

Twentieth Day of January, 2004

JON W. DUDAS
*Acting Director of the United States Patent and Trademark Office*